Patented July 28, 1942

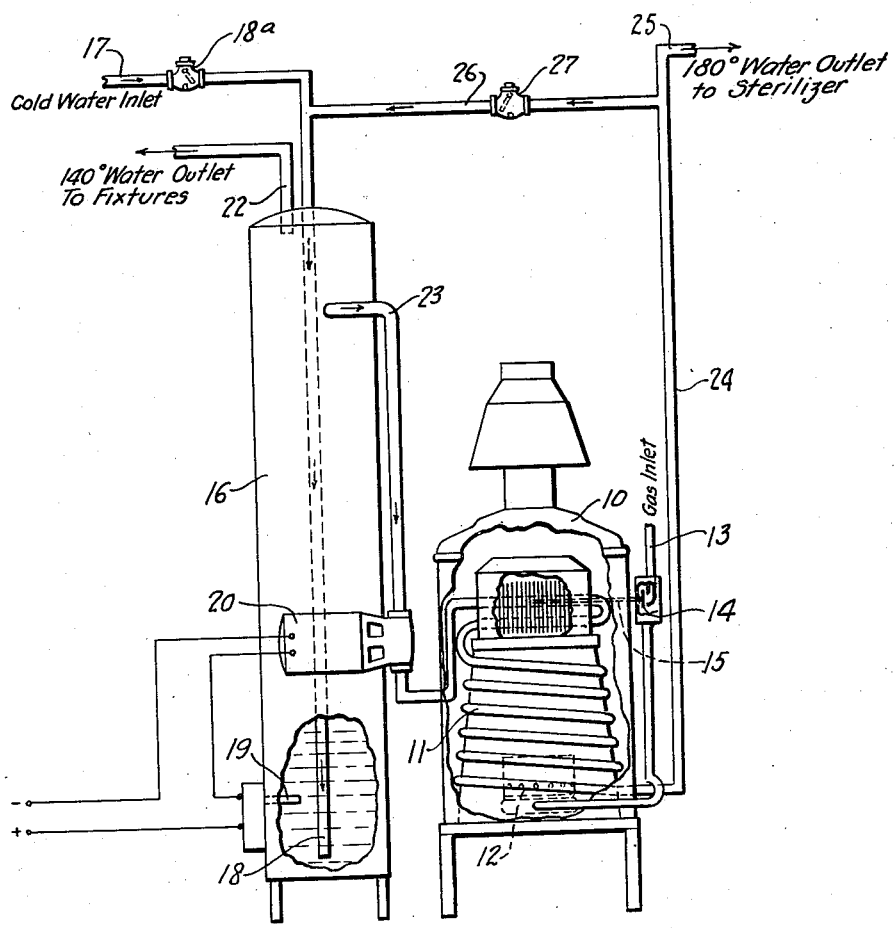
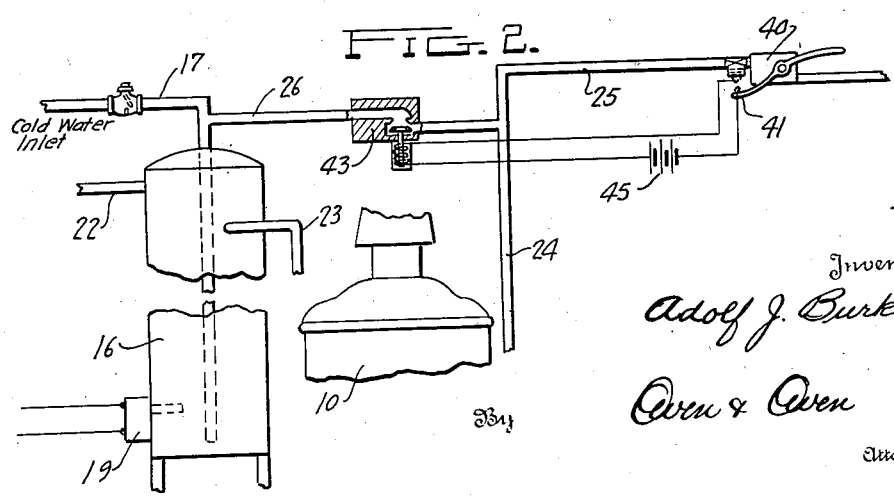

2,291,023

UNITED STATES PATENT OFFICE 2,291,023

DOUBLE TEMPERATURE WATER HEATING UNIT

Adolf J. Burklin, Toledo, Ohio, assignor to The Burkay Company, Toledo, Ohio, a corporation of Ohio Application February 2, 1940, Serial No. 316,989

4 Claims. (Cl. 126—362)

This invention relates to water heating units and is particularly directed to a unit capable of supplying water at two temperatures for different uses.

Many communities are now requiring that dishes and other tableware of restaurants and the like be sterilized by the use of hot water or otherwise. The operation of commercial dish washing equipment requires a considerable quantity of hot water at sterilizing temperature, for example, 180° F., in order to comply with the various health laws.

It has been found impracticable to maintain the entire supply of hot water at the sterilizing temperature of 180° because of the large heat loss encountered and because of the fact that the maintenance of such high temperatures in systems using "hard" water causes the deposition of lime to soon choke the storage tank and associated equipment.

Instantaneous heaters of the type which take cold water from the mains and heat it as it is required are not satisfactory because the great temperature rise from main temperature to sterilizing temperature requires a heater of inordinate capacity. It has heretofore been proposed to remedy this by storing water at an intermediate temperature and then to utilize a heater to "boost" the temperature of the preheated water to the sterilizing temperature required. Installations of this character have heretofore required that two heaters be used, one for the ordinary hot water supply and the second one for the supply of sterilizing water.

The primary object of the present invention is to provide a heating unit which is capable of supplying sterilizing water but which maintains its own supply of preheated water for ordinary uses.

Another object of the invention is the provision of an installation of the above character which is completely automatic and in which the controls are simple, positive, and efficient.

Other objects and advantages of the invention will become apparent as the description proceeds, reference being had to the accompanying drawing in which Fig. 1 is a diagrammatic representation, with parts broken away, of a unit embodying the invention, and Fig. 2 is a diagrammatic representation of a modified water control arrangement.

Referring to the drawing, the invention is shown diagrammatically and includes a heater 10 which may be fired with gas or any other suitable fuel and which has heating coils 11 disposed to receive heat from a burner 12. Fuel is supplied from an inlet 13 and the supply is controlled automatically by a thermostatically operated valve 14 which operates in accordance with the temperature of the water in the heating coils as registered by an immersion type thermostat 15. The thermostat is subjected to the temperature of the water at a point intermediate the inlet and discharge sides of the heater, and as the temperature of the water rises the thermostat closes the opening of valve 14.

In addition to the heater, a storage tank 16 is used and is supplied with water from a cold water inlet 17 entering the tank through the usual dip tube 18 which terminates near the bottom of the interior. A swing check valve 18ª is interposed in the cold water line 17.

An aquastat 19 is subjected to the temperature of the water within the tank and connected to one side of an electric power supply and to a circulating pump 20, which latter is connected to the opposite side of the power supply so that it is in series with and controlled by the aquastat 19. Under certain circumstances it is possible to dispense with the circulating pump 20, as hereinafter described.

Two water outlets are provided near the top of the storage tank 16, one of which runs directly to the ordinary hot water fixtures in the building and is designated 22 in the drawing. The other outlet from the storage tank is designated 23 and is connected, through the circulating pump 20, to the inlet side of the heating coils 11.

The outlet side of the heating coils 11 is connected to a hot water line 24, which latter runs directly to a sterilizing water supply pipe 25 and is, in addition, connected back to the storage tank inlet through a pipe 26 controlled by a swing check valve 27.

The operation of the unit is such that the tank 16 is maintained full of water at an intermediate temperature of about 140°, for example. This water is suitable for direct use in the ordinary hot water fixtures of a building. Whenever the temperature of the water in the tank falls below the setting of the aquastat 19, which may be 140°, as indicated, the aquastat closes its circuit in the usual manner and the circulating pump 20 commences to pump water from the tank through outlet 23 and into the heater. The heater thermostat is set at such a temperature that the discharge from the heater through pipe 24 is at the sterilizing temperature, for example, 180°. Thus the intermediate temperature water entering the heater causes the thermostat 15 to open valve 14 and start fuel flowing to the heater. Assuming for the moment that the heater is merely making up for temperature lost from the tank 16 by radiation, the discharge from the pipe 24 will open the check valve 27 and pass through pipe 26, into the dip tube 18 and the storage tank. The entrance of this hot water will restore the temperature of the water in the tank 16 so that the aquastat 19 will open the circuit to the circulating pump and stop the flow of water.

If the 140° outlet is opened as, for example, by a user turning on one of the hot water faucets, cold water entering the dip tube will reduce the temperature of the water adjacent the aquastat 19 and start circulation of the water through the heater in the same manner as above described and the 180° water discharged through pipes 24 and 26 will mingle with the cold water entering the dip tube in an effort to maintain the 140° temperature set by the aquastat 19.

If the sterilizing water is used, the pressure in pipe 25 will be reduced since the discharge is now from this pipe and water will be drawn from the tank through pipe 23 to the heater and raised in its temperature and discharged through pipe 24 to pipe 25. In this event the swing check valve 27 will not open because of the reduction in pressure in pipe 25. As soon as the cold water commences to enter the tank, the aquastat 19 will start the circulating pump 20 to force water through the heater. When the demand for the sterilizing water has stopped, the heater may continue for a short time to restore the temperature of the water in the tank 16 to its set point, 140° in the example used.

It will be appreciated that the controls are completely automatic and that the cycle of operation is such that the heater 10 operates to furnish sterilizing water at an elevated temperature when demanded and during the time when such demand is relieved, operates to maintain the temperature of the preheated water in the tank 16.

In the form above described the circulating pump 20 is used to direct the flow of water through the pipes 24 and 26 in restoring the temperature in the tank. However, this restoration can be accomplished by thermo-syphon action if means are used to cut off the recirculation when the sterilizing water is used. Controls to accomplish this are shown diagrammatically in Fig. 2 in which a sterilizing water valve 40 is associated with a circuit closer 41 so as to complete an electric circuit whenever the sterilizing water is used. A solenoid water valve 43 is used in place of the swing check 27 and is open by gravity and closed by the force of its associated coil. A power supply 45 is inserted in the solenoid-switch circuit.

In the form shown in Fig. 2, return flow to the storage is caused by the thermo-syphon force of the heated water except when its path is closed by the water valve 43. In this way the circulating pump is dispensed with, but the remaining controls used to govern water temperature are the same.

While the invention has been described in connection with a specific type of heater and illustrative installation, it should be appreciated that various modifications and changes will suggest themselves to those skilled in the art and that such changes may be made without departing from the invention as defined in the appended claims.

What I claim as new and desire to secure by United States Letters Patent is:

1. A water heating unit including a storage tank, a low temperature water inlet line and two higher temperature water outlet lines connected to said tank, one of said outlet lines constituting an intermediate temperature water supply line, a single heater, means to connect the other of said outlet lines to the heater, a high temperature discharge line connected to the heater, a return connection between said discharge line and the storage tank, and means in the return connection to prevent water in the latter, when the discharge line is open, from entering the tank, and to allow water to enter the tank from the discharge line when the latter is closed.

2. A water heating unit in accordance with claim 1, wherein the return connection discharges its water into the tank to mingle with and thereby directly heat the water in the tank.

3. A water heating unit in accordance with claim 1, wherein the heater has a coil one end of which is connected to the high temperature discharge line and the other end of which is connected to the means which connect said other higher temperature outlet of the tank to the heater.

4. A water heating unit in accordance with claim 1, wherein the return connection leads into the low temperature water inlet line of the storage tank.

ADOLF J. BURKLIN.